United States Patent
Okano

(10) Patent No.: US 11,165,790 B2
(45) Date of Patent: Nov. 2, 2021

(54) MALICIOUS COMMUNICATION LOG DETECTION DEVICE, MALICIOUS COMMUNICATION LOG DETECTION METHOD, AND MALICIOUS COMMUNICATION LOG DETECTION PROGRAM

(71) Applicant: NIPPON TELEGRAPH AND TELEPHONE CORPORATION, Chiyoda-ku (JP)

(72) Inventor: Yasushi Okano, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 175 days.

(21) Appl. No.: 16/307,290

(22) PCT Filed: Jun. 1, 2017

(86) PCT No.: PCT/JP2017/020515
§ 371 (c)(1),
(2) Date: Dec. 5, 2018

(87) PCT Pub. No.: WO2017/221667
PCT Pub. Date: Dec. 28, 2017

(65) Prior Publication Data
US 2019/0173897 A1    Jun. 6, 2019

(30) Foreign Application Priority Data
Jun. 20, 2016    (JP) .............................. JP2016-122045

(51) Int. Cl.
*H04L 29/06* (2006.01)
*G06F 21/55* (2013.01)
(Continued)

(52) U.S. Cl.
CPC ........ *H04L 63/1416* (2013.01); *G06F 16/313* (2019.01); *G06F 16/353* (2019.01);
(Continued)

(58) Field of Classification Search
CPC ............. H04L 63/1416; H04L 63/1425; H04L 63/1433; G06F 21/55; H03M 7/30
(Continued)

(56) References Cited

U.S. PATENT DOCUMENTS 7,865,953 B1 * 1/2011 Hsieh .................. G06F 16/9566
726/22
9,043,894 B1 * 5/2015 Dennison ............ H04L 63/1408
726/11
(Continued)

FOREIGN PATENT DOCUMENTS

WO    WO 2008/055156 A2    5/2008

OTHER PUBLICATIONS

International Search Report dated Aug. 15, 2017 in PCT/JP2017/020515 filed on Jun. 1, 2017.
(Continued)

*Primary Examiner* — Dant B Shaifer Harriman
(74) *Attorney, Agent, or Firm* — Oblon, McClelland, Maier & Neustadt, L.L.P.

(57) ABSTRACT

A malicious communication log detection device compresses first character strings representing characteristics of a communication log that is known to be malicious or benign, and second character strings obtained by coupling the first character strings with a character string representing a characteristic of a target communication log. The malicious communication log detection device calculates a score for determining whether the target communication log is malicious or benign based on a data size of the compressed first character strings and a data size of the compressed
(Continued)

second character strings. The malicious communication log detection device determines whether the target communication log is malicious or benign based on the calculated score and a predetermined parameter.

8 Claims, 8 Drawing Sheets

(51) Int. Cl.
  *G06F 16/35* (2019.01)
  *G06F 16/31* (2019.01)
  *H03M 7/30* (2006.01)

(52) U.S. Cl.
  CPC .............. *G06F 21/55* (2013.01); *H03M 7/30* (2013.01); *H04L 63/1425* (2013.01); *H04L 63/1433* (2013.01); *H03M 7/3084* (2013.01)

(58) Field of Classification Search
  USPC .......................................................... 726/22
  See application file for complete search history.

(56) References Cited

U.S. PATENT DOCUMENTS

| | | | | |
|---|---|---|---|---|
| 9,241,010 | B1* | 1/2016 | Bennett | H04L 63/1433 |
| 9,401,947 | B1* | 7/2016 | Oztaskent | G06F 16/686 |
| 10,104,113 | B1* | 10/2018 | Stein | H04L 63/1433 |
| 10,205,704 | B2 | 2/2019 | Hodgman | H04L 63/1425 |
| 10,318,735 | B2* | 6/2019 | Saxe | G06N 3/04 |
| 10,594,655 | B2* | 3/2020 | Hodgman | H04L 63/1466 |
| 2003/0065926 | A1* | 4/2003 | Schultz | H04L 63/145 |
| | | | | 713/188 |
| 2010/0153785 | A1 | 6/2010 | Keromytis et al. | |
| 2012/0144484 | A1 | 6/2012 | Keromytis et al. | |
| 2013/0305098 | A1 | 11/2013 | Keromytis et al. | |
| 2014/0173734 | A1 | 6/2014 | Keromytis et al. | |
| 2016/0124926 | A1* | 5/2016 | Fallah | G06F 3/0236 |
| | | | | 715/271 |
| 2016/0364568 | A1 | 12/2016 | Keromytis et al. | |
| 2017/0237445 | A1* | 8/2017 | Cox | H03M 7/3068 |
| | | | | 341/51 |
| 2019/0065744 | A1* | 2/2019 | Gaustad | G06F 21/562 |
| 2019/0207969 | A1* | 7/2019 | Brown | G06F 21/552 |
| 2019/0387005 | A1* | 12/2019 | Zawoad | H04L 63/1425 |
| 2020/0327225 | A1* | 10/2020 | Nguyen | G06F 21/554 |

OTHER PUBLICATIONS

"McAfee Security Information and Event Management," Intel Security, Jun. 3, 2016, http://www.mcafee.com/jp/promos/siem/index.aspx, 10 total pages (with Partial English Translation).

"IBM QRadar Security Intelligence Platform," IBM, Jun. 3, 2016, http://www-03.ibm.com/software/products/ja/qradar, 8 total pages (with Partial English Translation).

Perdisci, R. et al., "Behavioral Clustering of HTTP-Based Malware and Signature Generation Using Malicious Network Traces," NSDI, Apr. 2010, pp. 1-14.

Bratko, A. et al., "Spam Filtering Using Statistical Data Compression Models," Journal of Machine Learning Research, vol. 7, Dec. 2006, pp. 2673-2698.

Nishida, K. et al., "Tweet-Topic Classification using Data Compression," DBSJ Journal, vol. 10, No. 1, Jun. 2011, pp. 1-6 (with English Abstract).

* cited by examiner

MALICIOUS COMMUNICATION LOG DETECTION DEVICE, MALICIOUS COMMUNICATION LOG DETECTION METHOD, AND MALICIOUS COMMUNICATION LOG DETECTION PROGRAM

FIELD

The present invention relates to a malicious communication log detection device, a malicious communication log detection method, and a malicious communication log detection program.

BACKGROUND

In the related art, as a method of detecting malicious communication such as an internal attack with malware or information leakage, known is Security Information and Event Management (SIEM) of analyzing a communication log based on various rules (for example, refer to Non Patent Literature 1 or 2). There is also known a method of automatically generating a rule for analysis through machine learning such as clustering (for example, refer to Non Patent Literature 3).

As a method of text analysis, known is a method of classifying data using data compression (for example, refer to Non Patent Literature 4 or 5). In such a method using data compression, classification is performed by using easiness of compression at the time when different pieces of data are coupled.

CITATION LIST

Non Patent Literature

Non Patent Literature 1: McAfee SIEM, [online], [searched on Jun. 3, 2016], Internet (http://www.mcafee-.com/jp/promos/siem/index.aspx)

Non Patent Literature 2: IBM QRadar Security Intelligence Platform, [online], [searched on Jun. 3, 2016], Internet (http://www-03.ibm.com/software/products/ja/gradar)

Non Patent Literature 3: Perdisci, et al., "Behavioral Clustering of HTTP-Based Malware and Signature Generation Using Malicious Network Traces," NSDI, p. 26, April 2010.

Non Patent Literature 4: Bratko, et al., "Spam filtering using statistical data compression models", Journal of Machine Learning Research, vol. 7, pp. 2673-2698, 2006.

Non Patent Literature 5: Nishida et al., "Tweet-Topic Classification using Data Compression", DBSJ Journal, Vol. 10, No. 1, 2011.

SUMMARY

Technical Problem

However, there has been a problem in conventional methods such that a malicious communication log including unknown content is hardly detected. For example, as an example of a method of automatically generating a rule through machine learning, there is a method of performing learning and inference using a classifier or clustering, and using n-gram, Bag-of-Words, and the like. In such a method, in a case in which a communication log as a detection target includes a word that is unknown at the time of learning, the word is ignored in inference, and is not evaluated. In this case, if the word is a word that characterizes malicious communication, a malicious communication log cannot be detected in some cases.

Solution to Problem

To solve a problem and to achieve an object, a malicious communication log detection device includes: a compression unit configured to compress, using a predetermined algorithm, first character strings representing characteristics of a communication log that is known to be malicious or benign, and second character strings obtained by coupling the first character strings with a character string representing a characteristic of a communication log as a classification target; a calculation unit configured to calculate a score for determining whether the communication log as a classification target is malicious or benign based on a data size of the first character strings compressed by the compression unit and a data size of the second character strings compressed by the compression unit; and a determination unit configured to determine whether the communication log as a classification target is malicious or benign based on the score calculated by the calculation unit and a predetermined parameter.

To solve a problem and to achieve an object, a malicious communication log detection method executed by a malicious communication log detection device, the method includes: a compression step for compressing, using a predetermined algorithm, first character strings representing characteristics of a communication log that is known to be malicious or benign, and second character strings obtained by coupling the first character strings with a character string representing a characteristic of a communication log as a classification target; a calculation step for calculating a score for determining whether the communication log as a classification target is malicious or benign based on a data size of the first character strings compressed at the compression step and a data size of the second character strings compressed at the compression step; and a determination step for determining whether the communication log as a classification target is malicious or benign based on the score calculated at the calculation step and a predetermined parameter.

To solve a problem and to achieve an object, a malicious communication log detection program that causes a computer to execute: a compression step for compressing, using a predetermined algorithm, first character strings representing characteristics of a communication log that is known to be malicious or benign, and second character strings obtained by coupling the first character strings with a character string representing a characteristic of a communication log as a classification target; a calculation step for calculating a score for determining whether the communication log as a classification target is malicious or benign based on a data size of the first character strings compressed at the compression step and a data size of the second character strings compressed at the compression step; and a determination step for determining whether the communication log as a classification target is malicious or benign based on the score calculated at the calculation step and a predetermined parameter.

Advantageous Effects of Invention

According to the present invention, a malicious communication log including unknown content can be detected.

DESCRIPTION OF EMBODIMENTS

The following describes embodiments of a malicious communication log detection device, a malicious communication log detection method, and a malicious communication log detection program according to the present application in detail based on the drawings. The present invention is not limited to the embodiments.

Configuration of First Embodiment

Figure 1:
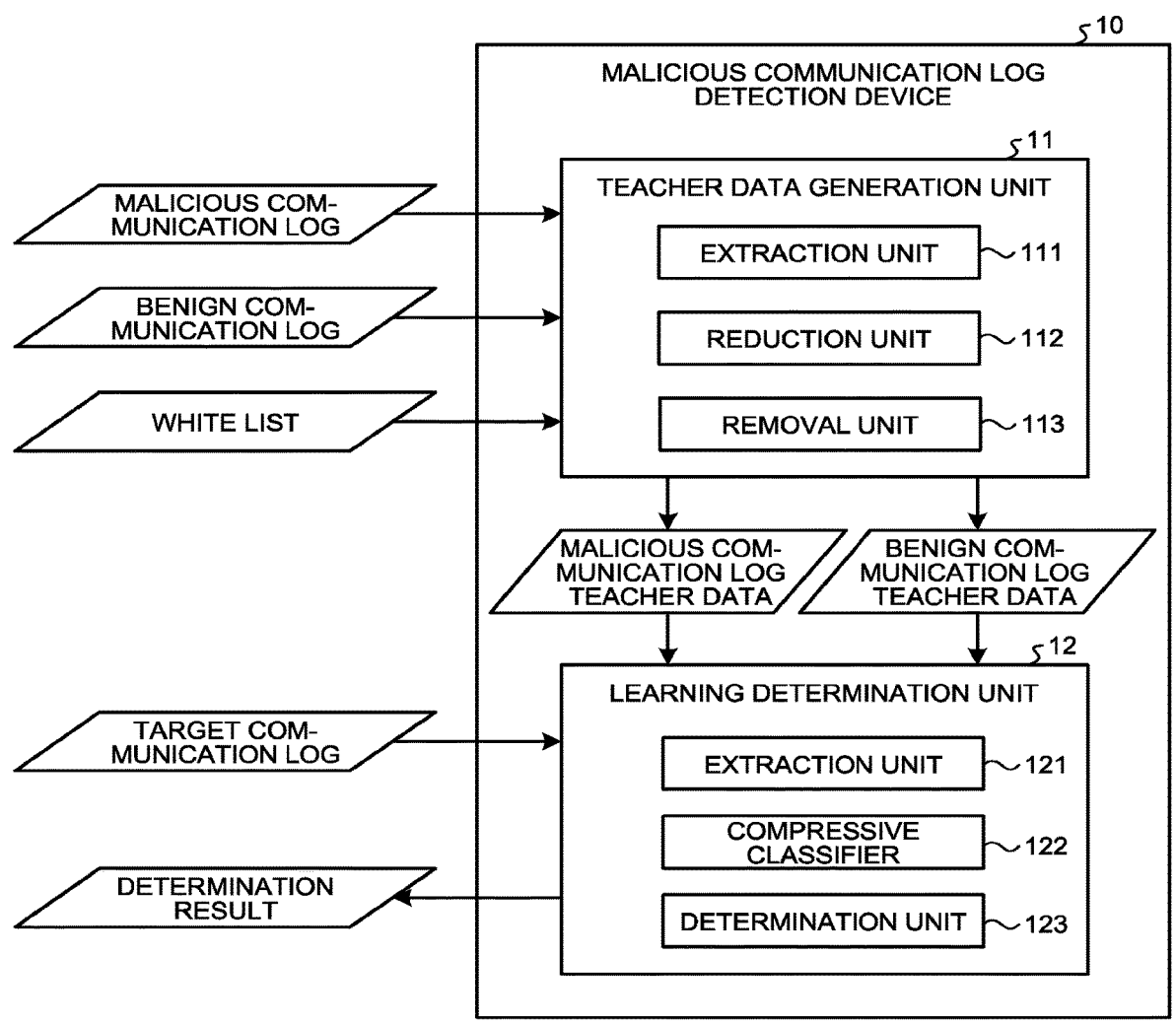
FIG. 1 is a diagram illustrating an example of a configuration of a malicious communication log detection device according to a first embodiment.

First, with reference to FIG. 1, the following describes a configuration of a malicious communication log detection device according to a first embodiment. FIG. 1 is a diagram illustrating an example of the configuration of the malicious communication log detection device according to the first embodiment. As illustrated in FIG. 1, a malicious communication log detection device 10 includes a teacher data generation unit 11 and a learning determination unit 12. The teacher data generation unit 11 includes an extraction unit 111, a reduction unit 112, and a removal unit 113. The learning determination unit 12 includes an extraction unit 121, a compressive classifier 122, and a determination unit 123.

The teacher data generation unit 11 extracts a characteristic and selects an instance based on a malicious communication log, a benign communication log, a white list, and the like to generate teacher data. The learning determination unit 12 learns the teacher data generated by the teacher data generation unit 11, and determines a target communication log.

The malicious communication log detection device 10 uses, as communication logs, for example, an access log to a Web server, a communication log with an HTTP Proxy server, and the like. A characteristic of the communication log is, for example, data represented by a character string.

The malicious communication log is a communication log that is known to be malicious, for example, a malicious communication log that is actually observed, communication data obtained by causing malware to be executed in virtual environment, attack communication data generated by a pseudo attack communication generator (fuzzing tool), and a URL blacklist. The benign communication log is a communication log that is known to be benign, for example, a communication log obtained from a terminal that is not infected by malware.

The extraction unit 111 of the teacher data generation unit 11 extracts character strings representing characteristics from the malicious communication log and the benign communication log. The teacher data generation unit 11 deletes a character string that satisfies a predetermined condition and is determined to be redundant from the character strings representing the characteristics of the communication log that is known to be malicious or benign. The character string representing the characteristic is a character string representing a characteristic of the malicious communication log and the benign communication log extracted by the extraction unit 111. Determination whether the character string is redundant and deletion of the character string are performed by the reduction unit 112 and the removal unit 113.

In a case in which the character strings representing the characteristics include a plurality of duplicate character strings, the reduction unit 112 deletes a predetermined number of character strings from the duplicate character strings to reduce the character strings. In this case, the reduction unit 112 may reduce the character strings so as to leave only one of the duplicate characteristics, or may reduce the character strings so as to leave the characteristics the number of which is a logarithm of the number of duplicate characteristics +1. That is, the reduction unit 112 may leave the duplicate character strings corresponding to the number of duplications while reducing duplications. The reduction unit 112 may reduce the character strings representing the characteristics of the malicious communication log using a method different from a method of reducing the character strings representing the characteristics of the benign communication log. The reduction unit 112 determines that the character strings are redundant when the character strings are duplicated.

The removal unit 113 removes the character string by deleting the character string having similarity equal to or larger than a predetermined value from the character strings representing the characteristics of the communication log that is known to be malicious, the similarity to a character string included in the character strings representing the characteristics of the communication log that is known to be benign. For example, the removal unit 113 removes a character string from the character strings representing the characteristics of the malicious communication log, the character string having an edit distance (Levenshtein distance) equal to or smaller than a predetermined value, the edit distance to the character string representing the characteristic of the benign communication log. The removal unit 113 determines that the character string is redundant when the similarity of the character string is equal to or larger than the predetermined value.

The removal unit 113 may remove a character string matching the white list from the character strings representing the characteristics of the malicious communication log. In this case, the removal unit 113 may perform determination whether the character string representing the characteristic of the malicious communication log matches the white list by determining whether the character string exactly matches the white list, may perform the determination based on the edit distance, or may perform the determination by determining whether the character string matches a regular expression pattern of the white list.

Order of processing performed by the reduction unit 112 and the removal unit 113 may be any order. The teacher data generation unit 11 outputs the character string representing the characteristic of each communication log processed by the reduction unit 112 and the removal unit 113 as malicious communication log teacher data or benign communication log teacher data. The processing is not necessarily performed by the reduction unit 112 and the removal unit 113.

Figure 3:
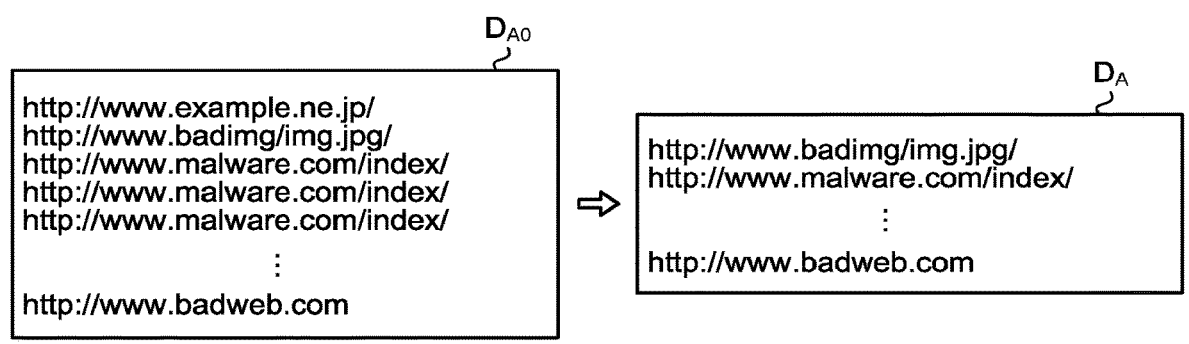
FIG. 3 is a diagram for explaining processing of a teacher data generation unit.
Figure 4:
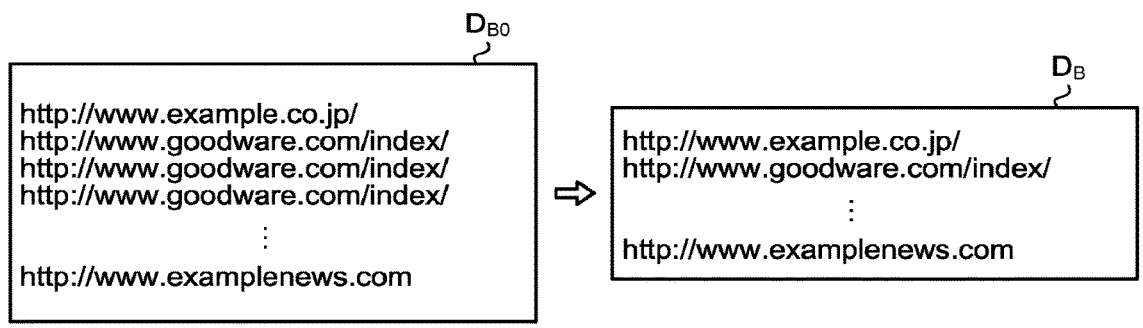
FIG. 4 is a diagram for explaining processing of the teacher data generation unit.

With reference to FIGS. 3 and 4, the following describes a specific example of the teacher data generation unit 11. FIGS. 3 and 4 are diagrams for explaining the processing of the teacher data generation unit. Character strings $D_{A0}$ in FIG. 3 are URLs extracted as the character strings representing the characteristics of the malicious communication log by the extraction unit 111. As illustrated in FIG. 3, "http://www.malware.com/index/" is duplicated in the character strings $D_{A0}$, so that the reduction unit 112 reduces the character strings $D_{A0}$ while leaving one of the duplicate character strings.

Character strings $D_{B0}$ in FIG. 4 are URLs extracted as the character strings representing the characteristics of the benign communication log by the extraction unit 111. As illustrated in FIG. 4, "http://www.goodware.com/index/" is duplicated in the character strings $D_{B0}$, so that the reduction unit 112 reduces the character strings $D_{B0}$ while leaving one of the duplicate character strings. Character strings $D_B$ in FIG. 4 are an example of the benign communication log teacher data.

Additionally, the removal unit 113 determines that similarity between "http://www.example.ne.jp/" in the character strings $D_{A0}$ and "http://www.example.co.jp/" in $D_{B0}$ is equal to or larger than a predetermined value, and removes "http://www.example.ne.jp/" in the character strings $D_{A0}$. Character strings $D_A$ in FIG. 3 are an example of the malicious communication log teacher data.

The extraction unit 121 of the learning determination unit 12 extracts a character string representing a characteristic from the target communication log. The compressive classifier 122 calculates a malicious score and a benign score of the target communication log. The compressive classifier 122 also learns the teacher data.

Figure 2:
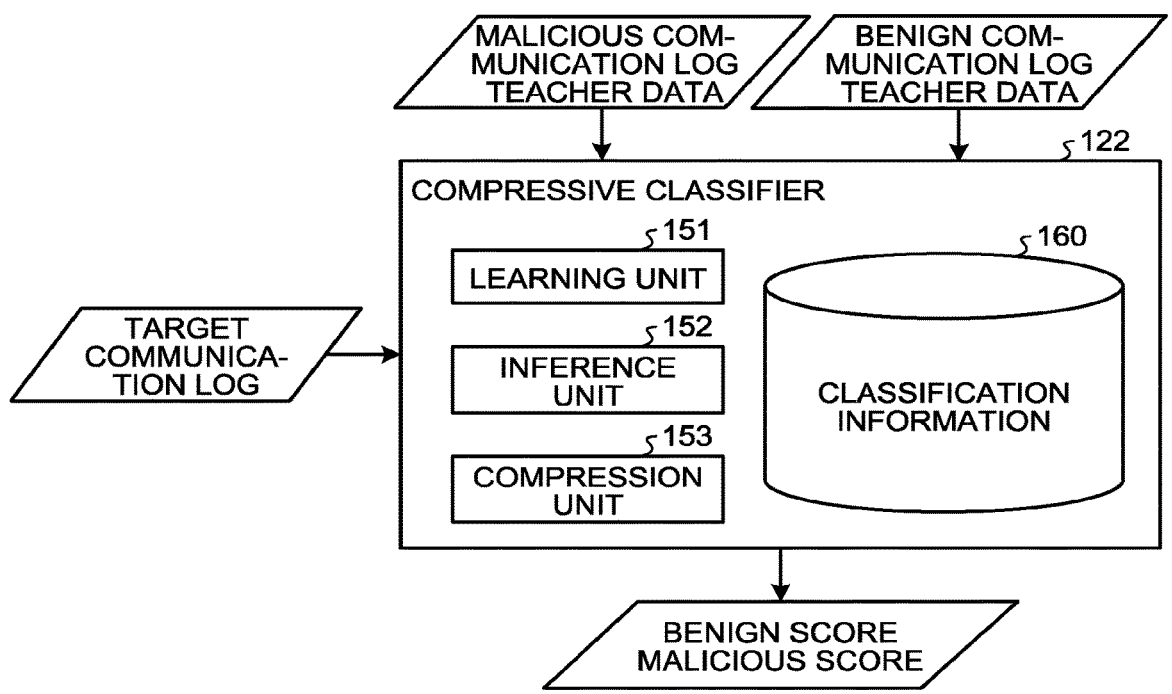
FIG. 2 is a diagram illustrating an example of a configuration of a compressive classifier.

As illustrated in FIG. 2, the compressive classifier 122 includes a learning unit 151, an inference unit 152, and a compression unit 153. The compressive classifier 122 stores classification information 160. FIG. 2 is a diagram illustrating an example of a configuration of the compressive classifier.

First, the learning unit 151 causes the compression unit 153 to compress the malicious communication log teacher data and the benign communication log teacher data. The compression unit 153 compresses, using a predetermined algorithm, the malicious communication log teacher data or the benign communication log teacher data, that is, first character strings. For example, the compression unit 153 can use an algorithm of a compression system focusing on a series of characters such as a dictionary-type compression algorithm and a context compression algorithm. Examples of the dictionary-type compression algorithm include LZSS (LZ77), LZW (LZ78), LZT, and LZMA. Examples of the context compression algorithm include Prediction by Partial Machine (PPM).

The learning unit 151 causes the compressive classifier 122 to store, as the classification information 160, the malicious communication log teacher data, the benign communication log teacher data, a data size of the malicious communication log teacher data compressed by the compression unit 153, and a data size of the benign communication log teacher data compressed by the compression unit 153.

In a case in which the compression unit 153 uses an algorithm for enabling additional compression, the learning unit 151 causes the compressed malicious communication log teacher data and the compressed benign communication log teacher data to be the classification information 160 in place of the malicious communication log teacher data and the benign communication log teacher data before compression to reduce the data size to be stored. In this case, the inference unit 152 can cause the compression unit 153 to perform compression after adding the character string representing the characteristic of the target communication log to the compressed data, and processing time is reduced.

Additionally, the inference unit 152 calculates the malicious score and the benign score for the character string representing the characteristic of the target communication log extracted by the extraction unit 121. The malicious score and the benign score are scores for determining whether the target communication log is obtained through malicious communication or benign communication.

First, the inference unit 152 couples the malicious communication log teacher data stored as the classification information 160 with the character string representing the characteristic of the target communication log. The inference unit 152 then causes the compression unit 153 to compress the coupled character string, and acquires a compressed data size. The compression unit 153 compresses, using a predetermined algorithm, second character strings obtained by coupling the first character strings with the character string representing the characteristic of the target communication log. The second character strings are character strings obtained by coupling the malicious communication log teacher data with the character string representing the characteristic of the target communication log, or character strings obtained by coupling the benign communication log teacher data with the character string representing the characteristic of the target communication log.

The inference unit 152 calculates the malicious score based on the compressed data size of the malicious communication log teacher data stored as the classification information 160, and the compressed data size of the coupled character string. Assuming that Z is a function for obtaining the compressed data size of the data, $D_A$ is the malicious communication log teacher data, x is the character string representing the characteristic of the target communication log, and the $D_A+x$ is data obtained by coupling $D_A$ with x, the inference unit 152 calculates the malicious score by an expression (1).

$$\text{malicious score} = Z(D_A+x) - Z(D_A) \quad (1)$$

Similarly, the inference unit 152 couples the benign communication log teacher data stored as the classification information 160 with the character string representing the characteristic of the target communication log. The inference unit 152 then causes the compression unit 153 to compress the coupled character string, and acquires the compressed data size. The inference unit 152 calculates the benign score based on the compressed data size of the benign communication log teacher data stored as the classification information 160 and the compressed data size of the coupled character string. Assuming that Z is a function for obtaining the compressed data size of the data, $D_B$ is the benign communication log teacher data, x is the character string representing the characteristic of the target communication log, and $D_B+x$ is data obtained by coupling the $D_B$ with x, the inference unit 152 calculates the benign score by an expression (2).

$$\text{benign score} = Z(D_B+x) - Z(D_B) \quad (2)$$

In this way, the inference unit 152 calculates a score for determining whether the target communication log is malicious or benign based on the data size of the first character strings compressed by the compression unit 153 and the data size of the second character strings compressed by the compression unit 153. For example, the inference unit 152 calculates the malicious score representing a degree that the target communication log is malicious, and the benign score representing a degree that the target communication log is benign.

Figure 5:
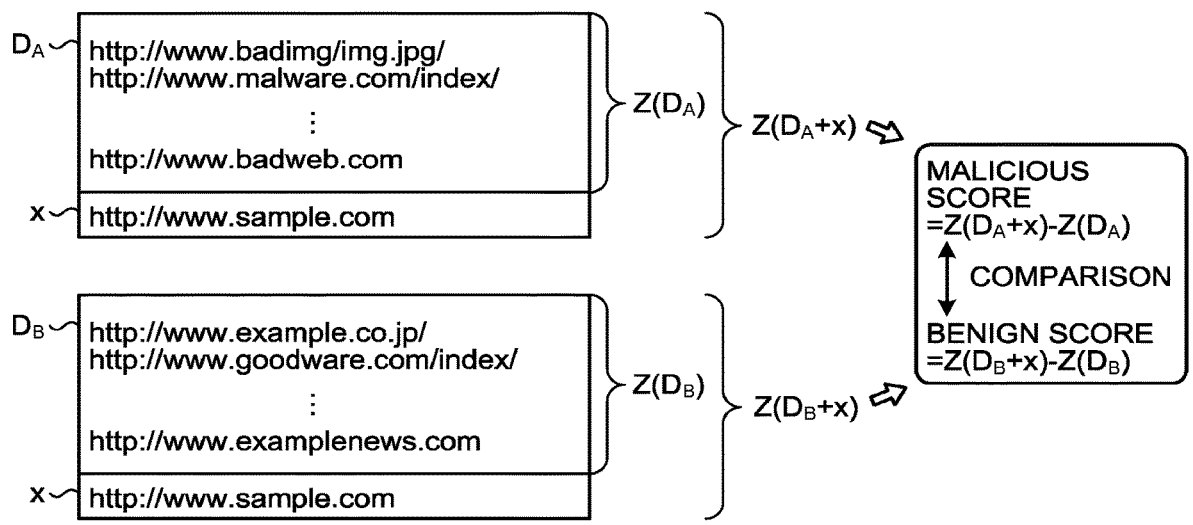
FIG. 5 is a diagram for explaining processing of an inference unit.

With reference to FIG. 5, the following describes specific processing of the inference unit 152. FIG. 5 is a diagram for explaining processing of the inference unit. As illustrated in FIG. 5, the inference unit 152 couples the character strings $D_A$ as the malicious communication log teacher data with the character string x representing the characteristic of the target communication log to calculate the malicious score. The inference unit 152 also couples the character string $D_B$ as the benign communication log teacher data with the character string x representing the characteristic of the target communication log to calculate the benign score.

The determination unit 123 determines whether the target communication log is malicious or benign based on the score calculated by the inference unit 152 and a predetermined parameter. In this case, when character strings are coupled and compressed, it can be considered that the size of the compressed data is reduced as similarity between the character strings increases. Thus, as the similarity between the character string representing the characteristic of the target communication log and the malicious communication log teacher data increases, $Z(D_A+x)$ in the expression (1) is reduced, and the malicious score is reduced. Similarly, as the similarity between the character string representing the characteristic of the target communication log and the benign communication log teacher data increases, $Z(D_B+x)$ in the expression (2) is reduced, and the benign score is reduced.

On the other hand, there is known an attack called buffer overflow that causes a data region for communication processing to overflow. In buffer overflow, communication including only the same characters may be sent, or conversely, communication including content that seems to be random and meaningless may be sent. A communication log obtained through buffer overflow needs to be determined to be a communication log obtained through malicious communication.

The data size of the character string that appears in the communication log in a case in which communication including only the same characters is sent may be excessively reduced when being compressed. The data size of the character string that appears in the communication log in a case in which communication including content that seems to be random and meaningless is performed may be excessively increased when being compressed. As a result, the malicious score and the benign score for the communication log obtained through buffer overflow may be both excessively reduced, or may be both excessively increased.

Based on the above description, if any of the following conditions 1-1, 1-2, and 1-3 is satisfied, the determination unit 123 determines that the target communication log is obtained through malicious communication.

benign score $< A_1$, and malicious score $< A_1$ (Condition 1-1)

benign score $> A_2$, and malicious score $> A_2$ (Condition 1-2)

benign score $> A_3 \times$ malicious score (Condition 1-3)

In this case, $A_1$, $A_2$, and $A_3$ are adjustment parameters, and adjusted by the learning unit 151 at the time of learning. The learning unit 151 adjusts a predetermined parameter based on a determination result of the determination unit 123. The learning unit 151 adjusts the parameter using a method of searching for a better parameter (cross validation, grid search, and the like) by actually determining part of the malicious communication log teacher data and the benign communication log teacher data.

If both of the malicious score and the benign score are smaller than a first value, or if both of the malicious score and the benign score are larger than a second value, the determination unit 123 determines that the target communication log is malicious. The first value is $A_1$. The second value is $A_2$.

For example, the learning unit 151 adjusts $A_1$ to be 0.0 to 0.4, and adjusts $A_2$ to be equal to or larger than 1.0. The condition 1-1 indicates a case in which both of the malicious score and the benign score are excessively small. The condition 1-2 indicates a case in which both of the malicious score and the benign score are excessively large. For example, the learning unit 151 adjusts $A_3$ to be equal to or larger than 1.0. The condition 1-3 indicates that the malicious score is sufficiently smaller than the benign score (the target communication log is sufficiently close to the malicious communication log). As $A_3$ increases, a determination rate (=the number of pieces of malicious communication that are correctly determined/the number of all pieces of communication) is reduced, but an erroneous determination rate (=the number of pieces of benign communication that are erroneously determined to be malicious/the number of all pieces of communication) is also reduced.

In this case, the inference unit 152 couples the character string representing the characteristic of the target communication log with the malicious communication log teacher data and the benign communication log teacher data, and causes the compression unit 153 to compress the entire coupled data, so that processing time is increased as the malicious communication log teacher data or the benign communication log teacher data becomes large.

Depending on the compression algorithm, under constraints of a memory or processing speed, when the data is too large, information of a head part of the data is not incorporated into compression of a backend part of the data in some cases (for example, an LZSS compression algorithm employing a slide dictionary system).

Thus, in a case in which the size of the malicious communication log teacher data or the benign communication log teacher data is larger than a predetermined size, the learning unit 151 may divide the malicious communication log teacher data or the benign communication log teacher data to be stored as the classification information 160. In this case, even when the malicious communication log teacher data or the benign communication log teacher data is added, the learning unit 151 may only add the added data to the classification information 160.

The following describes processing in a case in which the learning unit 151 divides the malicious communication log teacher data or the benign communication log teacher data. In a case in which the size of the malicious communication log teacher data or the benign communication log teacher data is larger than a predetermined size, the learning unit 151 divides the malicious communication log teacher data or the benign communication log teacher data so as to fall within a maximum size set in advance.

In this case, the learning unit 151 divides the data so that divided pieces of data have equal sizes as much as possible. The learning unit 151 may refer to recording time of the malicious communication log or the benign communication log, and collectively divide the data for each date and time.

Next, the learning unit 151 causes the compression unit 153 to separately compress each piece of the divided data. The learning unit 151 then causes the compressive classifier 122 to store the piece of the divided data and the compressed data size of each piece of data as the classification information 160. The compression unit 153 may compress each piece of data as parallel processing to reduce processing time.

The inference unit 152 then couples the character string representing the characteristic of the target communication log with each piece of the divided malicious communication log teacher data or the divided benign communication log teacher data included in the classification information 160, and causes the compression unit 153 to compress the coupled data. The compression unit 153 may compress each piece of data as parallel processing to reduce processing time.

Assuming that Z is a function for obtaining the compressed data size of the data, i is an identification number assigned to each piece of the divided data, $D_A(i)$ is the i-th piece of data among the pieces of divided malicious communication log teacher data, x is a character string representing a characteristic of the target communication log, $D_A(i)+x$ is data obtained by coupling $D_A(i)$ with x, min is a function for obtaining a minimum value, and γ is an adjustment parameter (smoothing parameter), the inference unit 152 calculates the malicious score by an expression (3).

$$\text{malicious score}=\{\min(Z(D_A(i)+x)-Z(D_A(i)))+\gamma\}/(\text{data size of } x+\gamma) \quad (3)$$

Similarly, assuming that Z is a function for obtaining the compressed data size of the data, i is an identification number assigned to each piece of the divided data, $D_B(i)$ is the i-th piece of data among the pieces of divided benign communication log teacher data, x is a character string representing a characteristic of the target communication log, $D_B(i)+x$ is data obtained by coupling $D_B(i)$ with x, min is a function for obtaining a minimum value, and γ is an adjustment parameter, the inference unit 152 calculates the benign score by an expression (4).

$$\text{benign score}=\{\min(Z(D_B(i)+x)-Z(D_B(i)))+\gamma\}/(\text{data size of } x+\gamma) \quad (4)$$

Assuming that γ=0 in the expressions (3) and (4), each score can be said to be a compression rate indicating a degree of compression of the character string representing the characteristic of the target communication log under the classification. As the data size of the character string representing the characteristic of the target communication log becomes smaller, the benign score and the malicious score come closer to 1, so that adjustment can be performed to ignore a character string having a small data size among character strings representing characteristics of the target communication log by increasing the parameter γ. For example, the inference unit 152 may calculate each score by obtaining an average value (average) in place of obtaining the minimum value (min). Even in a case in which the learning unit 151 divides the malicious communication log teacher data or the benign communication log teacher data, similarly to the expressions (1) and (2), the inference unit 152 may calculate a difference in data size before and after compression as the benign score and the malicious score. Even in a case in which the learning unit 151 does not divide the malicious communication log teacher data or the benign communication log teacher data, similarly to the expressions (3) and (4), the inference unit 152 may calculate the compression rate as the benign score and the malicious score.

Processing of First Embodiment

Figure 6:
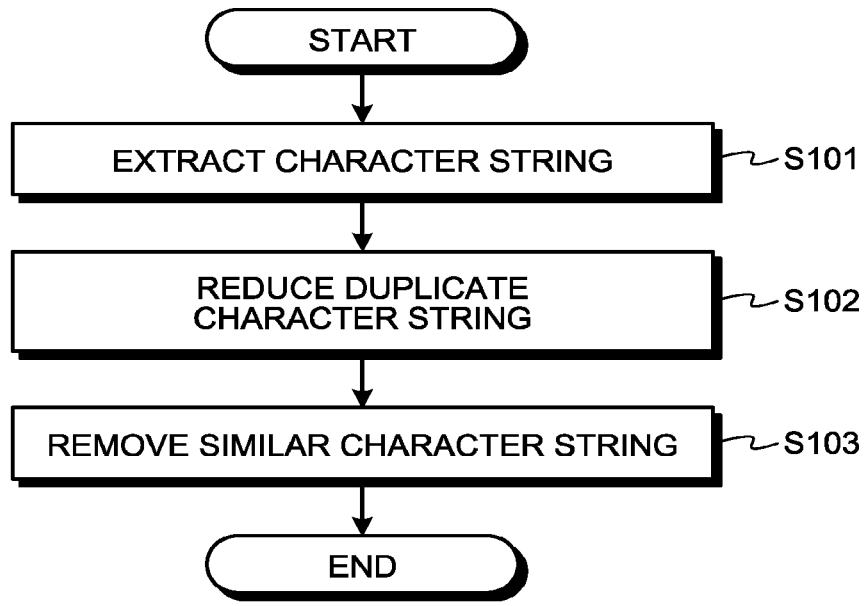
FIG. 6 is a flowchart illustrating an example of teacher data generation processing of the malicious communication log detection device.
Figure 7:
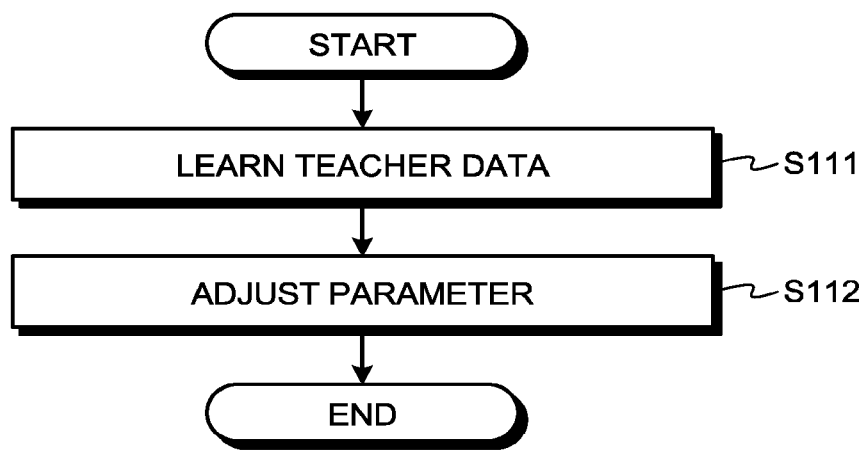
FIG. 7 is a flowchart illustrating an example of learning processing of the malicious communication log detection device.
Figure 8:
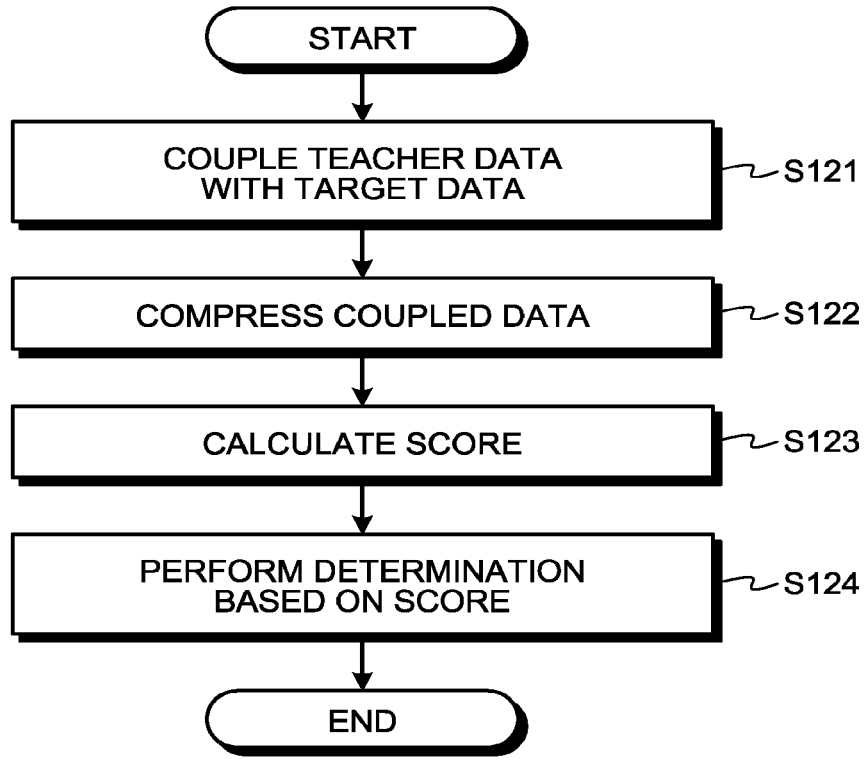
FIG. 8 is a flowchart illustrating an example of determination processing of the malicious communication log detection device.

With reference to FIGS. 6 to 8, the following describes processing of the malicious communication log detection device 10. FIG. 6 is a flowchart illustrating an example of teacher data generation processing of the malicious communication log detection device. FIG. 7 is a flowchart illustrating an example of learning processing of the malicious communication log detection device. FIG. 8 is a flowchart illustrating an example of determination processing of the malicious communication log detection device.

First, the following describes the teacher data generation processing performed by the teacher data generation unit 11. As illustrated in FIG. 6, the extraction unit 111 extracts, from the malicious communication log and the benign communication log, character strings representing characteristics of respective communication logs (Step S101). Next, the reduction unit 112 reduces duplicate character strings in the character strings extracted by the extraction unit 111 (Step S102). The removal unit 113 removes a character string similar to the character string representing the characteristic of the benign communication log from the character strings representing the characteristics of the malicious communication log (Step S103).

Next, the following describes the learning processing performed by the learning determination unit 12. As illustrated in FIG. 7, the learning unit 151 learns teacher data (Step S111). Specifically, the learning unit 151 causes the malicious communication log teacher data and the benign communication log teacher data themselves and the data size of each piece of the teacher data after being compressed by the compression unit 153 to be stored as the classification information 160. The learning unit 151 actually performs determination using part of the teacher data, and adjusts a parameter based on a determination result to perform learning of the compressive classifier 122 (Step S112). The learning determination unit 12 may perform the learning processing before the target communication log is determined, or may appropriately perform the learning processing in the middle of determination of the target communication log.

Next, the following describes the determination processing performed by the learning determination unit 12. As illustrated in FIG. 8, the inference unit 152 couples each piece of the malicious communication log teacher data and the benign communication log teacher data with target data, that is, the character string representing the characteristic of the target communication log extracted by the extraction unit 121 (Step S121). The inference unit 152 then causes the compression unit 153 to compress the coupled data (Step S122). The inference unit 152 calculates the score based on the compressed data size of the teacher data and the compressed data size of the coupled data (Step S123). The determination unit 123 determines whether the target data is malicious or benign based on the score (Step S124).

Figure 9:
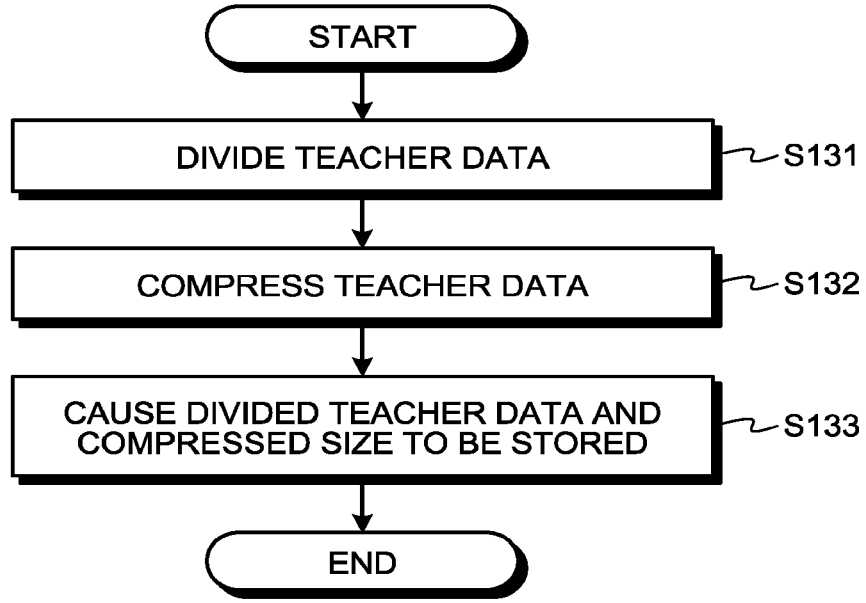
FIG. 9 is a flowchart illustrating an example of learning processing of the malicious communication log detection device at the time of data division.

The following describes the learning processing performed by the learning determination unit 12 in a case of dividing the teacher data with reference to FIG. 9. FIG. 9 is a flowchart illustrating an example of the learning processing of the malicious communication log detection device at the time of data division. As illustrated in FIG. 9, the learning unit 151 divides the teacher data (Step S131), and causes the compression unit 153 to compress each piece of the divided teacher data (Step S132). The learning unit 151 then causes each piece of the divided teacher data and a compressed size of each piece of the teacher data, that is, the compressed data size to be stored as the classification information 160 (Step S133). The learning unit 151 divides the teacher data before the determination processing is performed by the learning determination unit 12.

Effect of First Embodiment

The teacher data generation unit 11 deletes a character string that satisfies a predetermined condition and is determined to be redundant from the character strings representing the characteristics of the communication log that is known to be malicious or benign. The compression unit 153 compresses, using a predetermined algorithm, the first character strings from which the character string determined to be redundant by the teacher data generation unit 11 has been deleted, and the second character strings obtained by coupling the first character strings with the character string representing the characteristic of the target communication log. The inference unit 152 calculates the score for determining whether the target communication log is malicious or benign based on the data size of the first character strings compressed by the compression unit 153 and the data size of the second character strings compressed by the compression unit 153. The determination unit 123 determines whether the target communication log is malicious or benign based on the score calculated by the inference unit 152 and a predetermined parameter. The learning unit 151 adjusts the predetermined parameter based on the determination result of the determination unit 123.

In this way, in the first embodiment, the score for classification is calculated by using compression, so that the malicious communication log including unknown content can be detected. The data that is determined to be redundant is deleted in advance, so that erroneous detection can be prevented from being caused.

In a case in which the character strings representing the characteristics include a plurality of duplicate character strings, the reduction unit 112 deletes a predetermined number of character strings from the duplicate character strings. Due to this, influence of duplicate data can be reduced, and detection accuracy can be improved.

The removal unit 113 deletes, from among the character strings representing the characteristics of the communication log that is known to be malicious, a character string having similarity equal to or larger than a predetermined value, the similarity to the character string included in the character strings representing the characteristics of the communication log that is known to be benign. Due to this, erroneous detection can be reduced, the erroneous detection of determining the benign communication log to be the malicious communication log.

The compression unit 153 divides the first character strings into a plurality of strings to be compressed. The inference unit 152 then calculates the score for each of the divided strings of the first character strings. Due to this, in a case in which the size of the teacher data is large and the teacher data cannot be compressed at once under constraints of a memory or processing speed, determination can be performed.

The inference unit 152 calculates the malicious score representing a degree that the target communication log is malicious, and the benign score representing a degree that the target communication log is benign. If both of the malicious score and the benign score are smaller than the first value, or if both of the malicious score and the benign score are larger than the second value, the determination unit 123 determines that the target communication log is malicious. Due to this, the malicious communication log obtained through buffer overflow can be detected. In this case, determination is performed by using both of the malicious score and the benign score, so that determination accuracy is improved as compared with a case of using one of the scores.

Second Embodiment

In the first embodiment, described is a case in which the malicious communication log detection device 10 generates the teacher data based on the character strings representing the characteristics extracted from both of the malicious communication log and the benign communication log. On the other hand, in a second embodiment, described is a case in which the malicious communication log detection device 10 generates the teacher data based on the character strings representing the characteristics extracted from any one of the malicious communication log and the benign communication log.

Figure 10:
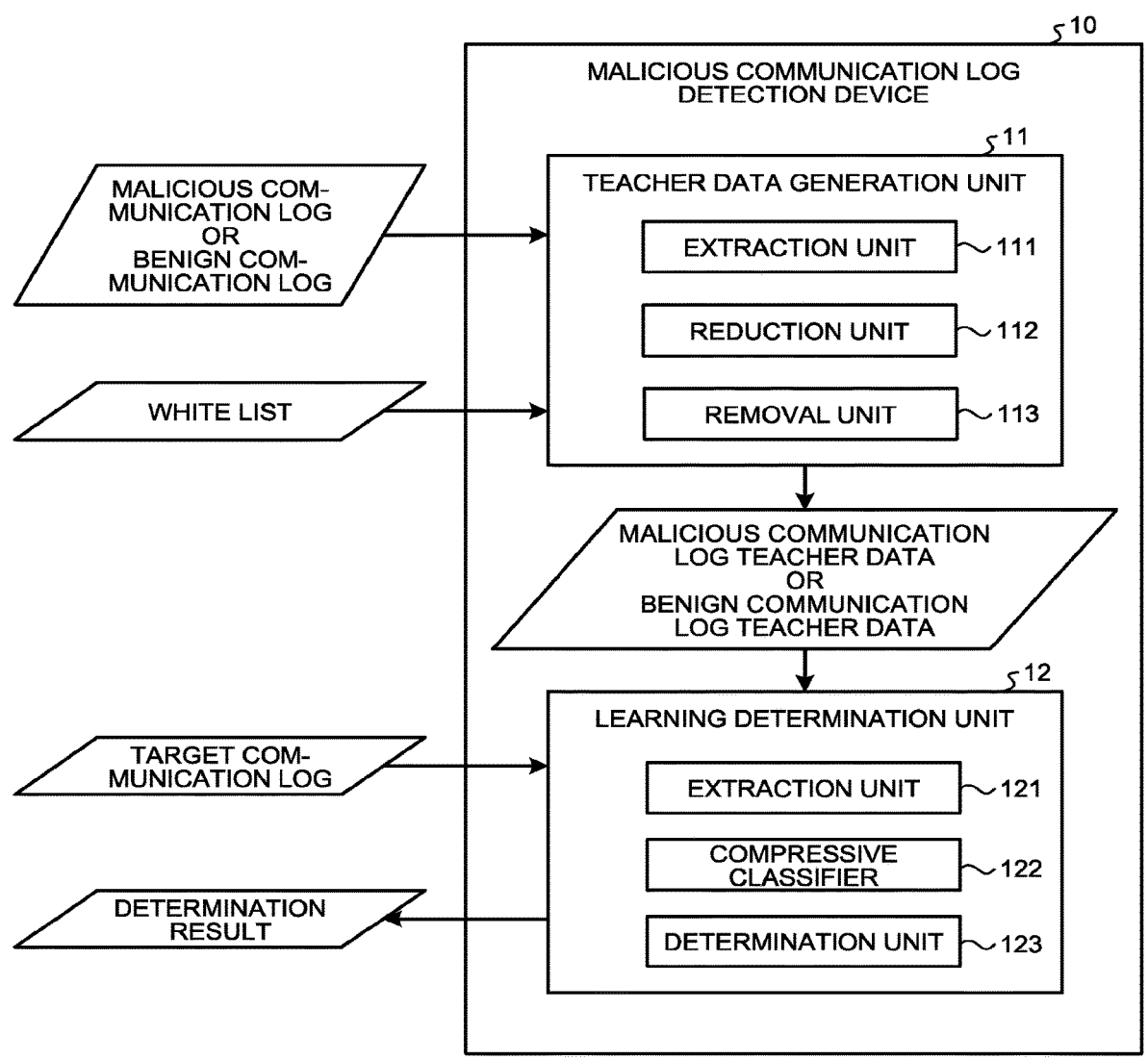
FIG. 10 is a diagram illustrating an example of a configuration of a malicious communication log detection device according to a second embodiment.

As illustrated in FIG. 10, in the second embodiment, the extraction unit 111 extracts the character strings representing the characteristics from any one of the malicious communication log and the benign communication log. FIG. 10 is a diagram illustrating an example of a configuration of the malicious communication log detection device according to the second embodiment.

In this case, the determination unit 123 performs determination using any one of the malicious score and the benign score. For example, in a case of performing determination using only the malicious score, if any of the following conditions 2-1 and 2-2 is satisfied, the determination unit 123 determines that the target communication log is obtained through malicious communication.

malicious score<$A_4$  (Condition 2-1)

malicious score>$A_5$  (Condition 2-2)

where $A_4$ and $A_5$ are adjustment parameters.

In this case, the inference unit 152 calculates the malicious score representing a degree that a communication log as a classification target is malicious. If the malicious score is smaller than a third value, or if the malicious score is larger than the fourth value, the determination unit 123 determines that the target communication log is malicious. In this case, the third value is $A_4$. A fourth value is $A_5$.

For example, in a case of performing determination using only the benign score, if any of the following conditions 3-1 and 3-2 is satisfied, the determination unit 123 determines that the target communication log is obtained through malicious communication.

benign score<$A_6$  (Condition 3-1)

benign score>$A_7$ (Condition 3-2)

where $A_6$ and $A_7$ are adjustment parameters.

In this case, the inference unit 152 calculates the benign score representing a degree that the communication log as a classification target is benign. If the benign score is smaller than the third value, or if the benign score is larger than the fourth value, the determination unit 123 determines that the target communication log is benign. In this case, the third value is $A_6$. The fourth value is $A_7$.

The conditions 2-1 and 3-1 represent a case in which the compression rate is excessively large such as buffer overflow of sending communication including only the same characters. The condition 2-2 represents a case in which the compression rate is excessively small such as buffer overflow of sending communication including content that seems to be random and meaningless. The condition 3-2 represents a case in which the compression rate is excessively small, and a case in which similarity to the benign communication log is small.

Effect of Second Embodiment

The inference unit 152 calculates the score representing any one of a degree that the communication log as a classification target is malicious and a degree that the communication log as a classification target is benign. If the score is smaller than the third value, or if the score is larger than the fourth value, the determination unit 123 determines that the communication log as a classification target is malicious.

The second embodiment can be easily introduced because only one of the malicious communication log and the benign communication log that can be easily prepared should be prepared. In a case of causing only the benign communication log to be the teacher data, communication deviating from normal communication can be detected, that is, what is called anomaly detection can be performed.

Alternatively, flexible operation can be performed such that detection is first performed based on the second embodiment using any one of the malicious communication log and the benign communication log, and subsequently, the operation is switched to the first embodiment at the time when both of the malicious communication log and the benign communication log becomes available.

Third Embodiment

In the first embodiment, the malicious communication log detection device 10 performs learning and determination based on the score calculated by the compressive classifier 122. On the other hand, in a third embodiment, the malicious communication log detection device 10 performs learning and determination using a classification result obtained by another classifier in addition to the score calculated by the compressive classifier 122.

Figure 11:
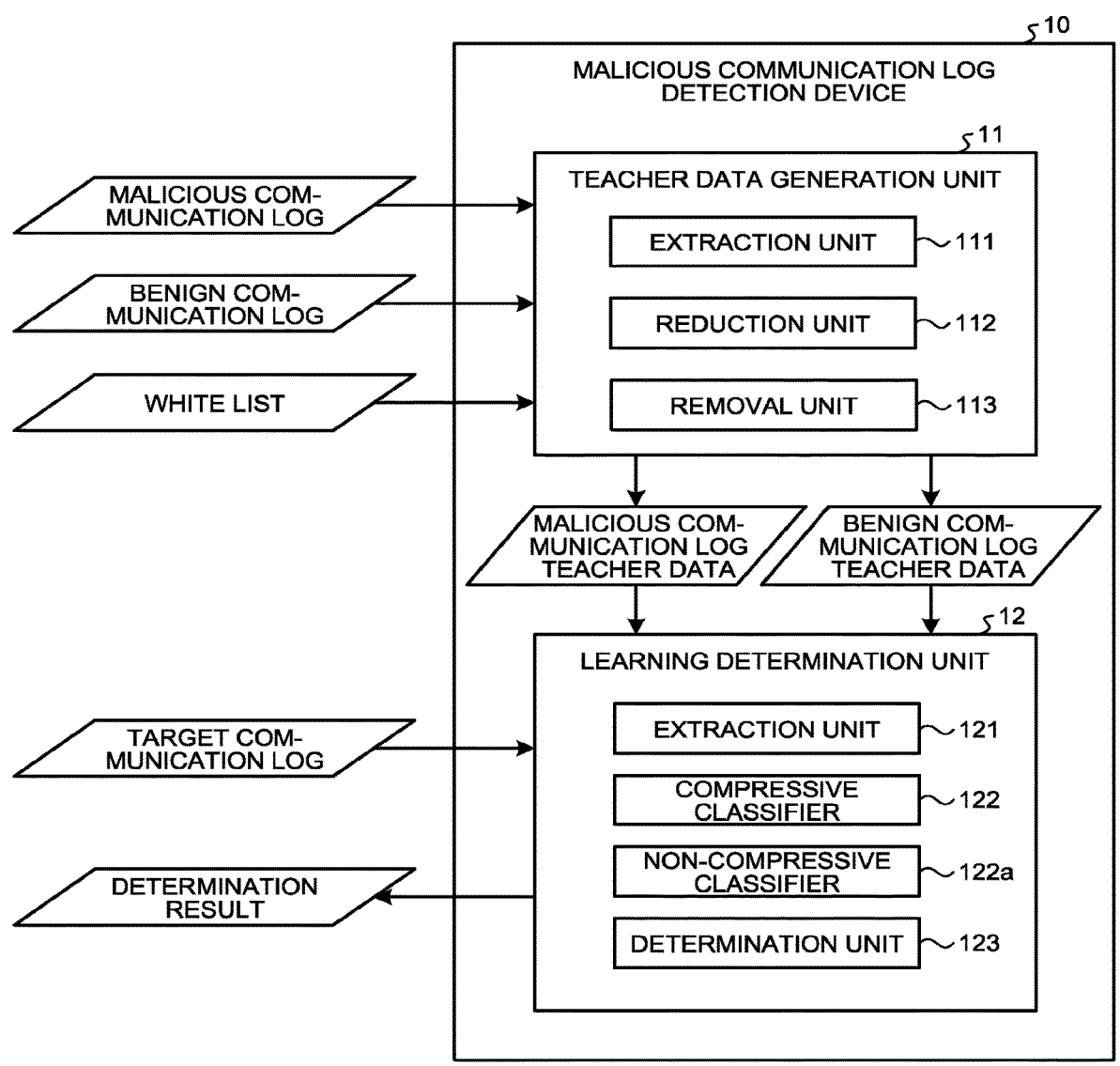
FIG. 11 is a diagram illustrating an example of a configuration of a malicious communication log detection device according to a third embodiment.

As illustrated in FIG. 11, in the third embodiment, the malicious communication log detection device 10 includes a non-compressive classifier 122a. FIG. 11 is a diagram illustrating an example of a configuration of the malicious communication log detection device according to the third embodiment.

For example, the compressive classifier 122 calculates the score based on binary information and text having a certain length such as a URL and a browser name as information representing the characteristics of the communication log. On the other hand, the non-compressive classifier 122a performs classification using a short attribute such as a numerical value representing a destination port number, a transfer amount, and the like. Thus, in the third embodiment, the malicious communication log detection device 10 performs learning and determination based on the score calculated by the compressive classifier 122 and a classification result obtained by the non-compressive classifier 122a.

For example, the non-compressive classifier 122a learns, with another appropriate classifier such as a support vector machine, a characteristic amount of the short attribute. The non-compressive classifier 122a learns the malicious score and the benign score calculated by the compressive classifier 122, and teacher data of a different designated attribute. The teacher data of a different designated attribute means an attribute of a characteristic as a target of the compressive classifier 122, that is, a characteristic of an attribute different from an attribute for compression. For example, the compressive classifier 122 uses a URL as a characteristic, but the non-compressive classifier 122a uses a destination port number, a transfer amount, and the like as a characteristic. The non-compressive classifier 122a may treat the characteristic of the different designated attribute as Bag-of-Words, or as a numerical value as it is.

The determination unit 123 determines whether the target communication log is malicious or benign based on the score calculated by the inference unit 152, the predetermined parameter, and a characteristic amount extracted from the character string representing the characteristic of the communication log having an attribute different from that of the first character strings.

The determination unit 123 determines whether the target communication log is malicious or benign based on a determination result on the basis of the malicious score and the benign score calculated by the compressive classifier 122, and a characteristic of a different designated attribute used by the non-compressive classifier 122a. For example, the determination unit 123 performs determination using, as a classifier, a decision tree, a support vector machine, a neural network, and the like. The characteristic of a different designated attribute treated by the non-compressive classifier 122a may include part or all of the characteristics used by the compressive classifier 122. For example, the characteristic of a different designated attribute may include a domain name of a URL as a characteristic used by the compressive classifier 122.

Effect of Third Embodiment

The determination unit 123 determines whether the target communication log is malicious or benign based on the score calculated by the inference unit 152, the predetermined parameter, and the characteristic amount extracted from the character string representing the characteristic of the communication log having an attribute different from that of the first character string.

Due to this, by adjusting the parameter of the classifier used by the determination unit 123, the same effect as that of parameter adjustment in the first embodiment can be obtained. By way of example, the following describes a case of assuming a URL as an attribute for compression, and using a decision tree as a classifier of the determination unit 123. The decision tree is, for given classification and a given characteristic, an algorithm of automatically generating a condition rule for determining classification based on a large/small relation of a threshold with respect to the characteristic.

In this case, "malicious or benign" as classification is given to the decision tree, and "benign score, malicious score, or benign score/malicious score" is given thereto as a characteristic. In this case, the decision tree generates conditions as follows for determining the log to be malicious. Due to this, the parameter can be adjusted by using the decision tree.

benign score<$A_{11}$ and malicious score<$A_{12}$    (Condition 4-1)

benign score>$A_{21}$ and malicious score>$A_{22}$    (Condition 4-2)

benign score/malicious score>$A_{31}$    (Condition 4-3)

where $A_{11}$, $A_{12}$, $A_{21}$, $A_{22}$, and $A_{31}$ are adjustment parameters.

System Configuration and the Like

The components of the devices illustrated in the drawings are merely conceptual, and it is not required that it is physically configured as illustrated necessarily. That is, specific forms of distribution and integration of the devices are not limited to those illustrated in the drawings. All or part thereof may be functionally or physically distributed/integrated in arbitrary units depending on various loads or usage states. All or optional part of processing functions performed by the devices may be implemented by a central processing unit (CPU) and a program analyzed and executed by the CPU, or may be implemented as hardware using wired logic.

Among pieces of processing described in the present embodiment, all or part of pieces of processing described to be automatically performed may be manually performed, or all or part of pieces of processing described to be manually performed may be automatically performed using a well-known method. In addition, a processing procedure, a control procedure, a specific name, and information including various pieces of data and parameters that are described herein and illustrated in the drawings may be optionally modified unless otherwise specifically noted.

Program

According to one embodiment, the malicious communication log detection device 10 can be implemented by installing, in a desired computer, a malicious communication log detection program that detects the malicious communication log as package software or online software. For example, by causing an information processing device to execute the malicious communication log detection program, the information processing device can be caused to function as the malicious communication log detection device 10. The information processing device herein encompasses a desktop or laptop personal computer. In addition, the information processing device encompasses a mobile communication terminal such as a smartphone, a mobile phone, and a personal handyphone system (PHS), a slate terminal such as a personal digital assistant (PDA), and the like.

Assuming that a terminal device used by a user is a client, the malicious communication log detection device 10 may also be implemented as a malicious communication log detection server device that provides, to the client, a service related to the malicious communication log detection. For example, the malicious communication log detection server device may be implemented as a server device that provides a malicious communication log detection service using a communication log as an input and a determination result as an output. In this case, the malicious communication log detection server device may be implemented as a Web server, or may be implemented as a cloud that provides the service related to the malicious communication log detection by outsourcing.

Figure 12:
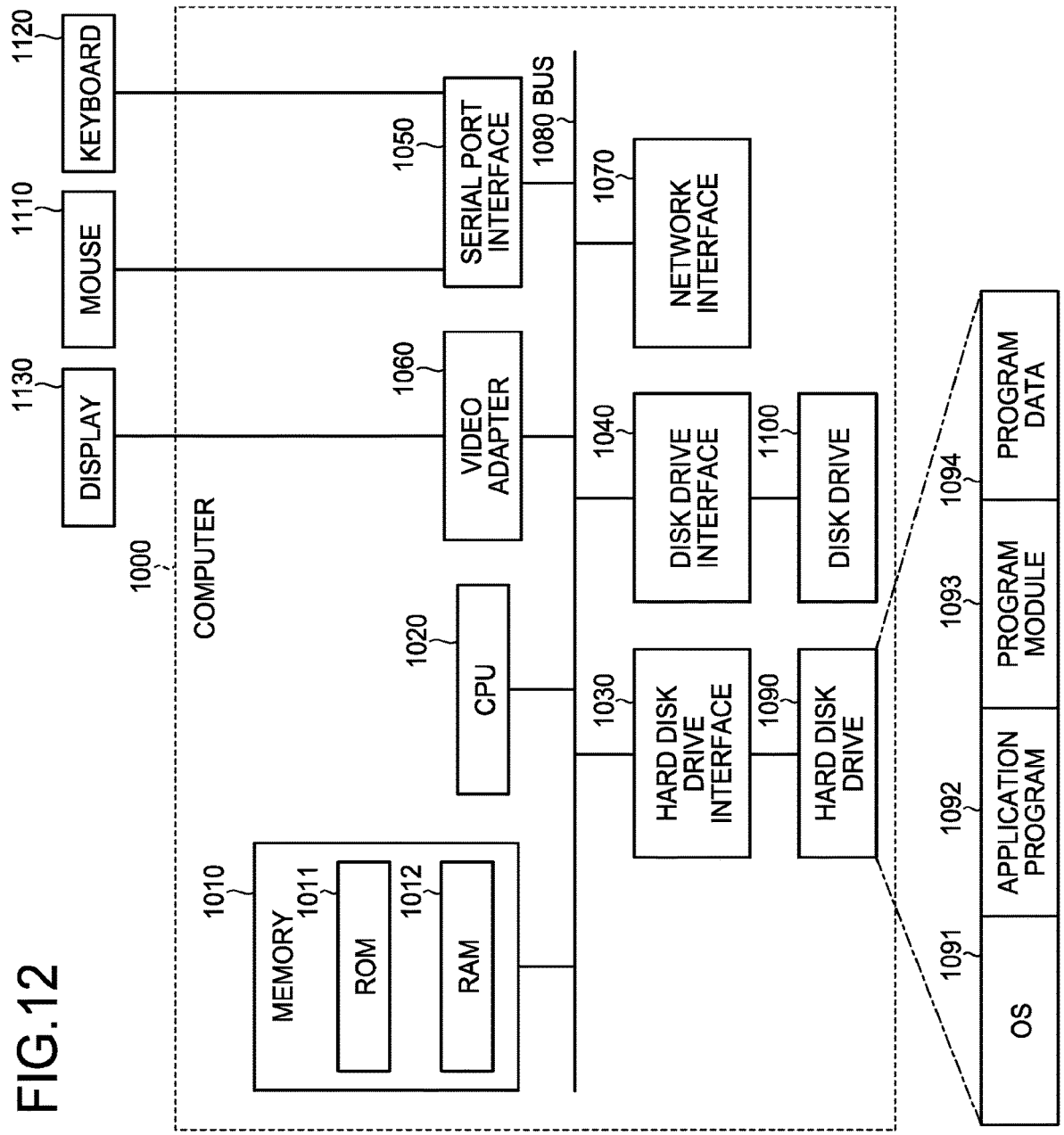
FIG. 12 is a diagram illustrating an example of a computer in which a malicious communication log detection device is implemented when a program is executed.

FIG. 12 is a diagram illustrating an example of a computer in which the malicious communication log detection device is implemented when a program is executed. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are connected to each other via a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a detachable storage medium such as a magnetic disc and an optical disc is inserted into the disk drive 1100. The serial port interface 1050 is connected, for example, to a mouse 1110 and a keyboard 1120. The video adapter 1060 is connected, for example, to a display 1130.

The hard disk drive 1090 stores, for example, an operating system (OS) 1091, an application program 1092, a program module 1093, and program data 1094. That is, a program that specifies pieces of processing of the malicious communication log detection device 10 is implemented as the program module 1093 in which a computer-executable code is described. The program module 1093 is stored, for example, in the hard disk drive 1090. For example, the hard disk drive 1090 stores the program module 1093 for executing the same processing as a functional configuration of the malicious communication log detection device 10. The hard disk drive 1090 may be replaced with a solid state drive (SSD).

Setting data used for the processing in the embodiments described above is stored, for example, in the memory 1010 or the hard disk drive 1090 as the program data 1094. The CPU 1020 then reads out, into the RAM 1012, the program module 1093 or the program data 1094 stored in the memory 1010 or the hard disk drive 1090 to be executed as needed.

The program module 1093 and the program data 1094 are not necessarily stored in the hard disk drive 1090. For example, the program module 1093 and the program data 1094 may be stored in a detachable storage medium, and read out by the CPU 1020 via the disk drive 1100 and the like. Alternatively, the program module 1093 and the program data 1094 may be stored in another computer connected via a network (a local area network (LAN), a wide area network (WAN), and the like). The program module 1093 and the program data 1094 may be read out from another computer by the CPU 1020 via the network interface 1070.

REFERENCE SIGNS LIST

10 Malicious communication log detection device
11 Teacher data generation unit
12 Learning determination unit
111, 121 Extraction unit
112 Reduction unit
113 Removal unit
122 Compressive classifier
123 Determination unit 151 Learning unit
152 Inference unit
153 Compression unit
160 Classification information

The invention claimed is:

1. A malicious communication log detection device comprising:
a memory; and
a processor coupled to the memory and programmed to execute a process comprising:
compressing, using a predetermined algorithm, first character strings representing characteristics of a communication log that is known to be malicious or benign, and second character strings obtained by coupling the first character strings with a character string representing a characteristic of a communication log as a classification target, wherein the first character strings and the second character strings include domain names of uniform resource locators (URLs);
calculating a score for determining whether the communication log as a classification target is malicious or benign based on a data size of the first character strings compressed by the compressing and a data size of the second character strings compressed by the compressing; and
determining whether the communication log as a classification target is malicious or benign based on the score calculated by the calculating and a plurality of adjustment parameters,
wherein
the calculating calculates a malicious score representing a degree that the communication log as a classification target is malicious, and a benign score representing a degree that the communication log as a classification target is benign, and
the determining determines that the communication log as a classification target is malicious when any one of the following conditions are met:
(i) both of the malicious score and the benign score are smaller than a first adjustment parameter of the adjustment parameters,
(ii) both of the malicious score and the benign score are larger than a second adjustment parameter of the adjustment parameters, and
(iii) the benign score is larger than a product of the malicious score and a third adjustment parameter of the adjustment parameters,
wherein the process further comprising adjusting the adjustment parameters based on a determination result obtained by the determining.

2. The malicious communication log detection device according to claim 1, wherein the process further comprising:
deleting, from the first character strings, a character string that satisfies a predetermined condition and is determined to be redundant, wherein
the compressing compresses the first character strings from which the character string determined to be redundant has been deleted by the deleting, and the second character strings.

3. The malicious communication log detection device according to claim 2, wherein, in a case in which the character strings representing the characteristic include a plurality of duplicate character strings, the deleting deletes a predetermined number of character strings from the duplicate character strings.

4. The malicious communication log detection device according to claim 2, wherein the deleting deletes, from the character strings representing characteristics of a communication log that is known to be malicious, a character string having similarity equal to or larger than a predetermined value, the similarity indicating a similarity to a character string included in the character strings representing characteristics of a communication log that is known to be benign.

5. The malicious communication log detection device according to claim 1, wherein
the compressing divides the first character strings into a plurality of strings and compresses the divided strings, and
the calculating calculates the score for each of the divided first character strings.

6. The malicious communication log detection device according to claim 1, wherein the determining determines whether the communication log as a classification target is malicious or benign based further on a characteristic amount extracted from a character string representing a characteristic of the communication log, the character string having an attribute different from an attribute of the first character strings.

7. A malicious communication log detection method executed by a malicious communication log detection device, the method comprising:
compressing, using a predetermined algorithm, first character strings representing characteristics of a communication log that is known to be malicious or benign, and second character strings obtained by coupling the first character strings with a character string representing a characteristic of a communication log as a classification target, wherein the first character strings and the second character strings include domain names of uniform resource locators (URLs);
calculating a score for determining whether the communication log as a classification target is malicious or benign based on a data size of the first character strings compressed at the compressing and a data size of the second character strings compressed at the compressing; and
determining whether the communication log as a classification target is malicious or benign based on the score calculated by the calculating and a plurality of adjustment parameters,
wherein
the calculating calculates a malicious score representing a degree that the communication log as a classification target is malicious, and a benign score representing a degree that the communication log as a classification target is benign, and
the determining determines that the communication log as a classification target is malicious when any one of the following conditions are met:
(i) both of the malicious score and the benign score are smaller than a first adjustment parameter of the adjustment parameters,
(ii) both of the malicious score and the benign score are larger than a second adjustment parameter of the adjustment parameters, and
(iii) the benign score is larger than a product of the malicious score and a third adjustment parameter of the adjustment parameters,
wherein the process further comprising adjusting the adjustment parameter based on a determination result obtained by the determining.

8. A non-transitory computer-readable recording medium including a stored program for malicious communication log detection program that causes a computer to execute a process comprising:
- compressing, using a predetermined algorithm, first character strings representing characteristics of a communication log that is known to be malicious or benign, and second character strings obtained by coupling the first character strings with a character string representing a characteristic of a communication log as a classification target, wherein the first character strings and the second character strings include domain names of uniform resource locators (URLs);
- calculating a score for determining whether the communication log as a classification target is malicious or benign based on a data size of the first character strings compressed at the compressing and a data size of the second character strings compressed at the compressing; and
- determining whether the communication log as a classification target is malicious or benign based on the score calculated by the calculating and a plurality of adjustment parameters, wherein
the calculating calculates a malicious score representing a degree that the communication log as a classification target is malicious, and a benign score representing a degree that the communication log as a classification target is benign, and
the determining determines that the communication log as a classification target is malicious when any one of the following conditions are met:
(i) both of the malicious score and the benign score are smaller than a first adjustment Parameter of the adjustment parameters,
(ii) both of the malicious score and the benign score are larger than a second adjustment parameter of the adjustment parameters, and
(iii) the benign score is larger than a product of the malicious score and a third adjustment parameter of the adjustment parameters,
wherein the process further comprising adjusting the adjustment parameters based on a determination result obtained by the determining.

* * * * *